United States Patent [19]

Ford et al.

[11] Patent Number: 4,569,591
[45] Date of Patent: Feb. 11, 1986

[54] LASER BORESIGHT ALIGNMENT MECHANISM FOR INTEGRATED LASER/FLIR RANGEFINDER

[75] Inventors: Eric H. Ford; Stephen B. Stayton, both of Richardson, Tex.

[73] Assignee: Texas Instruments Incorporated, Dallas, Tex.

[21] Appl. No.: 472,709

[22] Filed: Mar. 7, 1983

[51] Int. Cl.$^4$ .............................................. G01B 11/26
[52] U.S. Cl. ..................................................... 356/153
[58] Field of Search ............ 356/153, 4, 5; 33/1 DD, 33/DIG. 21, 286, 304; 350/484, 486; 250/330, 342

[56] References Cited

U.S. PATENT DOCUMENTS

| | | | |
|---|---|---|---|
| 3,352,196 | 11/1967 | Hammond, Jr. | 350/486 |
| 3,740,141 | 6/1973 | DeWitt, Jr. | 356/5 |
| 3,752,587 | 8/1973 | Myers et al. | 356/153 |
| 4,118,109 | 10/1978 | Crawford et al. | 350/484 |
| 4,155,096 | 5/1979 | Thomas et al. | 356/153 |
| 4,349,838 | 9/1982 | Daniel | 356/153 |
| 4,367,923 | 1/1983 | Ishikawa | 350/486 |
| 4,422,758 | 12/1983 | Godfrey et al. | 356/5 |

*Primary Examiner*—R. A. Rosenberger
*Attorney, Agent, or Firm*—Alva H. Bandy; Leo N. Heiting; Melvin Sharp

[57] ABSTRACT

In an integrated laser/FLIR rangefinder wherein the laser is injected into the visible optic path for transmission, a laser boresight mechanism comprises a light source for producing a light target, optic means for projecting the light target along the optical path of the laser beam, a switchable laser boresight retroreflector cube for switching into the visible optic path to reflect the light target back through the visible light optic path to the telescope field of view, and manual adjustment means for adjusting the optic means for aligning the light target and the recticle line of sight.

4 Claims, 21 Drawing Figures

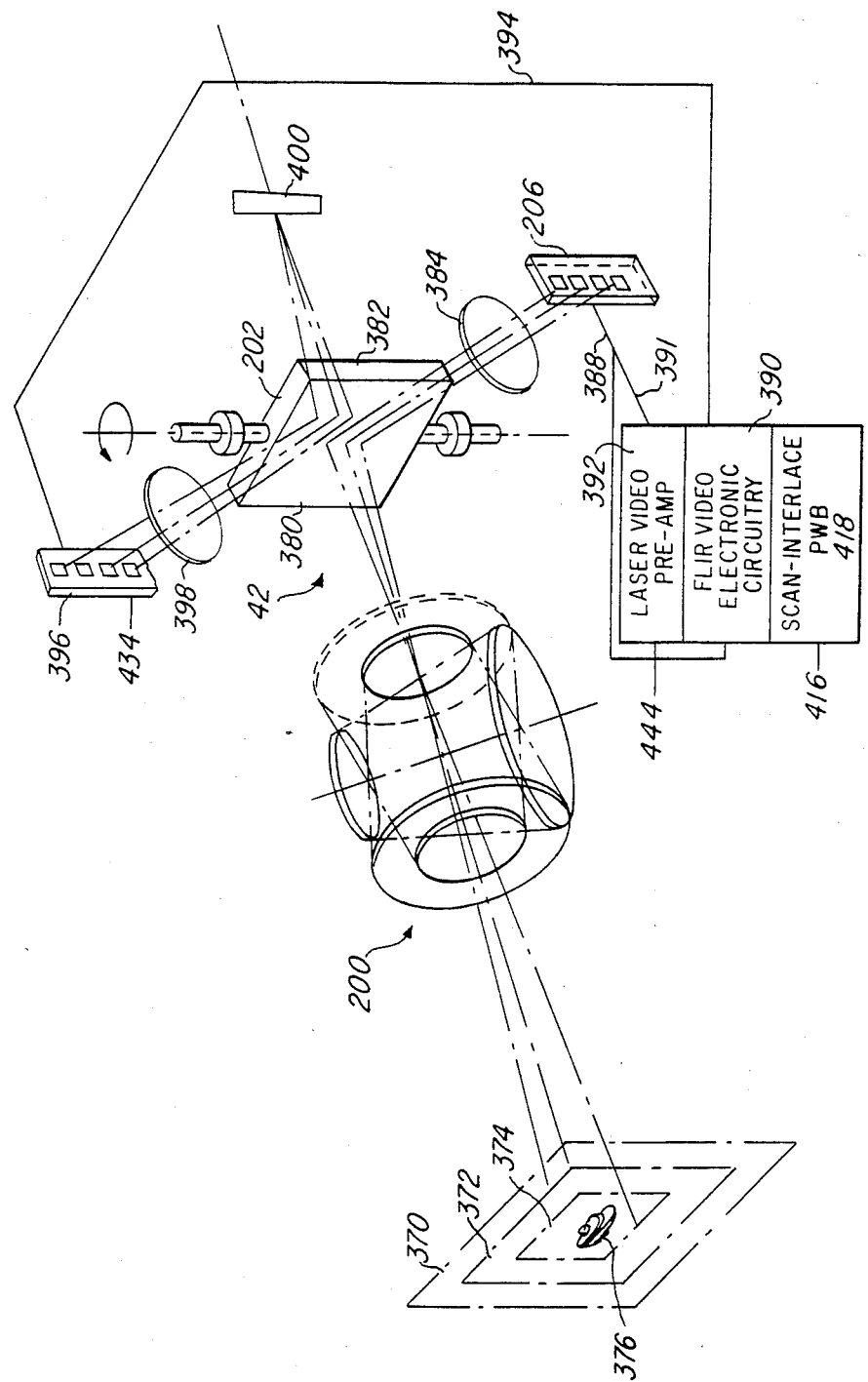

LASER BORESIGHT ALIGNMENT MECHANISM FOR INTEGRATED LASER/FLIR RANGEFINDER

This invention relates to a thermally integrated laser rangefinder and more particularly to an apparatus which combines a forward looking infrared (FLIR) system for locating and identifying targets and a laser system for determining the range to the targets.

In the past a typical rangefinding system included a coherent radiation source, such as, for example, a Nd:YAG Laser, which produces a pulse of energy which is transmitted to the target, reflected, and then received at the point of transmission. The total travel time is the measure of range to the target. The rangefinder is typically pointed at the target using information from a thermal imaging sensor, such as a FLIR.

The problems with the prior systems are many. In particular, the energy transmitted by a Nd:YAG Rangefinder under adverse weather conditions will be attenuated much more than the longer wavelength energy used by the FLIR and conditions can be such that a target can be seen but not ranged upon. This compatibility problem relates primarily to the spectral match between the FLIR and laser rangefinder.

The use of a FLIR system to locate a target and a separate laser rangefinder system to range the target includes the duplication of many parts because of the spectral match. The spectral match can be improved by using a longer wavelength laser transmitter. Nevertheless, the detection of the return energy from a long wavelength laser such as, for example, a $CO_2$ laser requires a receiver system having larger optics of more expensive materials to transmit and receive diffraction limited beams, and also requires a detector which needs cryogenic cooling to achieve adequate detector sensitivity. Such a system is very costly.

A FLIR system includes the types of components which are required by the receiver of the long-wavelength rangefinder. Under conditions where ranging would be performed, the FLIR uses a large aperture collecting lens system which focuses energy from the target onto a sensitive, cooled detector. This portion of the FLIR therefore duplicates the function which must be performed by the laser rangefinder receiver. Thus, from a cost effectiveness viewpoint the basic FLIR components should be utilized for the detection of laser pulses. But, this has not been achievable directly because of the difference in design requirements between a FLIR system and a laser rangefinder.

The FLIR is an imaging sensor, using an array of detectors to scan a large area; the target is only a small portion of the scanned area. Also sensitivity is achieved in the FLIR in part by operating each detector at the lowest possible information rate to decrease the noise bandwidth of the system. While the rangefinder must use short duration pulses which require wide receiver bandwidths to achieve adequate range resolution.

In addition, a rangefinder generally has a fixed axis while a FLIR requires a rotating or reciprocating axis for scanning the FLIR detector. The FLIR detector is a low frequency detector and processor, while the laser rangefinder detector is a high frequency detector and processor.

The above enumerated differences thus have led to the development of FLIR system designs which are independent of range finding requirements.

In addition, the combining of the laser and FLIR systems to form a cost efficient integrated rangefinder presents many other problems. For example, in a sighting device, having a visible energy optical channel and an infrared (IR) optical channel for a gunner and a commander, expensive sight reticles are required for each telescope in the visible energy optical channel and each IR display in the IR energy optical channel. Another problem attending the use of the visible energy optical channel for projecting the laser beam is the alignment of the laser with the visible energy optical channel. Still another problem is the need for a laser transmitter compatible with the range of the FLIR and/or weapon. Yet another problem is the monitoring of the laser firing and the synchronization of laser firing with the position of the FLIR's scanner. Yet still another problem is to utilize the FLIR to detect laser returns and provide spike type signals for the timing function.

Accordingly, it is an object of this invention to provide a cost effective integrated laser/FLIR rangefinder.

Another object of the invention is to provide an integrated laser rangefinder having a light forming sight and range information reticle and projector optics for projecting same onto the IR energy displays and visible energy telescopes, respectively, of the IR energy and visible energy optical channels.

Still another object of the invention is to provide an integrated laser/FLIR rangefinder having a light, harmless to the eye, in the visible energy light channel for boresighting the laser.

Yet another object of the invention is to provide an integrated laser/FLIR rangefinder having a low cost laser meeting the laser requirements of an integrated laser/FLIR rangefinder.

Still yet another object of the invention is to provide an integrated laser/FLIR rangefinder having a laser firing monitor and a FLIR scanner position sensor for synchronizing the scanner position with the laser firing.

A final object of the invention is to provide the integrated laser/FLIR rangefinder with a laser return detector means for detecting and providing a spike type signal indicative thereof.

Briefly stated the thermally integrated laser rangefinder invention comprises an optical system, a laser rangefinder system, and a forward looking infrared system integrated in order that parts having commonality are wherever possible utilized in each system.

The above objects and other objects or features of the invention will become more readily understood in the following detailed description taken in conjunction with the drawings in which:

FIGS. 13a–13b are functional diagrams of the forward looking infrared systems of the present invention;

Figure 1:
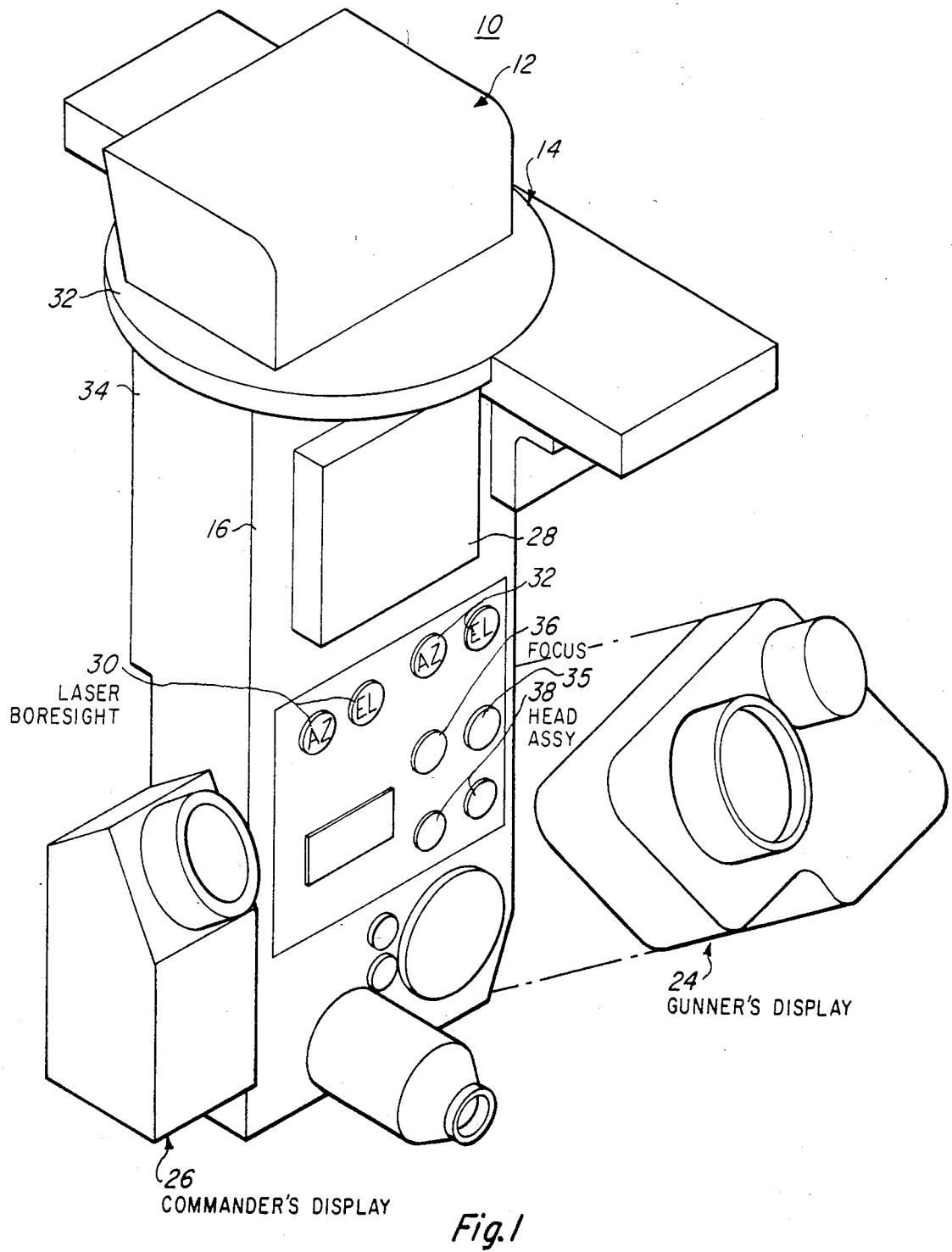
FIG. 1 is an isometric view of a first embodiment of the thermally integrated laser rangefinder (TILR)

Referring now to FIG. 1, the thermally integrated laser rangefinder 10 of the first embodiment comprises a rotatable head assembly 12, a mounting plate 14, a housing 16 for a combined visible and laser optics 18 (FIG. 3), infrared optics 20 including forward looking infrared (FLIR) system 42, a range display and boresight reticle projector 22 for a gunner's primary sight optics 24 (FIG. 1) and a commander's light pipe optics 26, and a laser transmitter 28.

The mounting plate 14 includes a flat plate 32 with two oppositely opposed side plates 34. The flat plate 32 supports the head mirror assembly 12 above and the optical housing 16 below; the side plates 34 are for attaching the thermally integrated laser rangefinder to its carrier (not shown). The carrier in the first embodiment is, for example, a tank or other vehicle having a gunner and a commander. It will be appreciated that the vehicle is for description of the invention purposes and not by way of limitation. The commander's light pipe 26 is connected to one side plate of housing 16; while the laser transmitter 28 is connected to the back plate of the housing 16. Manual knob drive mechanisms include laser boresight control 30, elevation and azimuth drift controls 32, first return/last return selection control 34, focus control 36, and head assembly elevation and azimuth controls 38.

Figure 2:
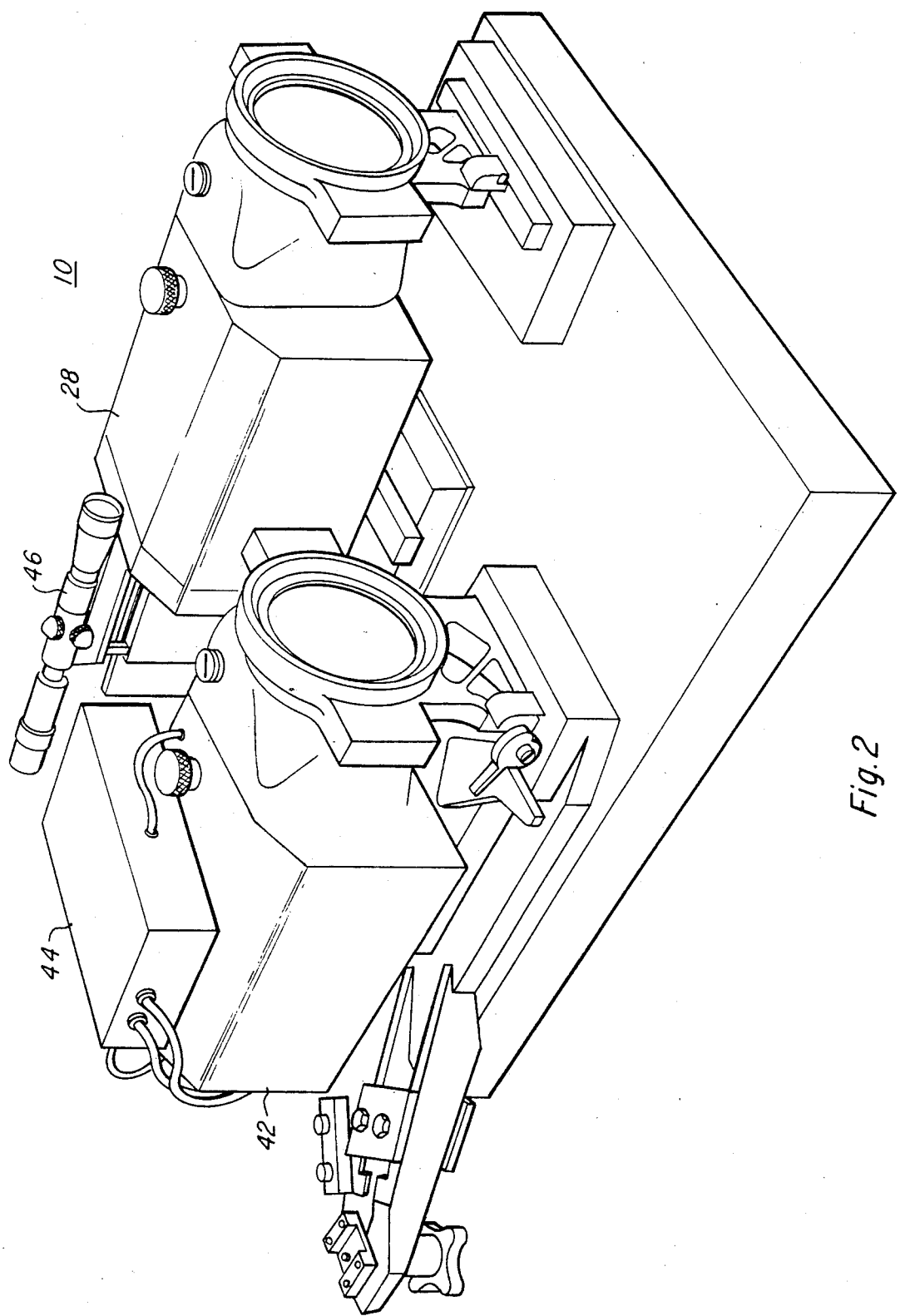
FIG. 2 is an isometric view of a second embodiment of the TILR invention.

Referring now to FIG. 2, the second embodiment of the TILR 10 comprises the laser transmitter system 28, a FLIR 42 and associated electronics 44. The laser transmitter system 28 is integrated with the FLIR 42 and associated electronics 44 as will be hereinafter described. A telescope 46 is mounted on the laser transmitter 40 or otherwise associated therewith for boresighting the laser. OPTICS Referring to FIG. 3, the thermally integrated laser rangefinder's optical head mirror assembly 12 comprises a stabilized two-axis head mirror 48. The mirror 48 is for reflecting laser energy from the visible optic channel 18 and receiving visible light for the visible optic channel 18, and for reflecting scattered laser energy received from a target and infrared (thermal) energy emanating from a scene including the target for the infrared channel 20.

The visible light optical system 18 has an optical path which includes a switchable laser boresight retrocube 50 for selective insertion and removal from the optic path, a laser beamsplitter 52 forming an optical path to a laser 54 of the laser transmitter 28, an objective lenses 56, a switchable muzzle reference lens 58 for selective insertion and removal from the optic path, and a beamsplitter and reticle visible (8×) and IR combiner cube (prism) 60 of the gunner's primary sight optical path 24.

The infrared optical system 20 has an infrared optical path which includes the forward looking infrared (FLIR) 42 to detect the scattered laser energy and provide a visible image of the detected thermal energy emanating from a scene, prism 62, triplet lens 64, and reticle and IR energy combiner and beamsplitter cube (prism) 66 of the gunner's primary sight optical path 24.

The range display and boresight reticle projector 22 include a digital range display 68 and a boresight reticle 70, a beamsplitter 72 for combining the range display 68 and boresight reticle 70, triplet lens 74, reflecting mirror 76, reticle and the gunner's primary sight IR channel combiner and beamsplitter cube 66.

The combined IR scene, boresight reticle and range display reticle passes through the gunners primary sight 24 having an optical path including lens 78, prism 80, tiplet objective lens 82, a scan position sensor 84, lens 86, reflecting mirror 88, lens 90, reflecting mirror 92, relay lens 94, reflecting mirror 96, afocal lens 98, and the visible image and reticle combiner beamsplitter cube 60.

The visible optic path of the gunner's primary sight optics 24 terminates at, for example, an 8× eyepiece 100 of one path of the combined visible, reticle beamsplitter 60, and the IR scene optic path terminates at a gunner's biocular (display) 102 in an optic path from one path of the IR/reticle combiner beamsplitter 66. The optic path to the gunner's biocular includes a doublet lens 104, prism 106, doublet lens 108, double refractive prism 110, and image intensifier tube of the biocular 102.

Finally, the commander's light pipe 26 has a combined visible and IR energy optic path from the visible and IR, reticle and range display combiner prism 60 which includes an inverting afocal telescope or collimating lens 112, reflector prism 114, reimaging relay lenses 116, 118, 120, and 122 and dichroic beamsplitter 124. The dichroic beamsplitter 124 begins a visible energy optic path including objective lens 126 and, for example, an 8× eyepiece 128 and an IR energy optic path including a folded objective lens group 130 and an image intensifier tube of the commander's biocular (display) 134.

The boresight reticle for the gunner's and commander's displays 24 and 26, both visible and IR, is generated by the single reticle 70 of the reticle and range readout projector 22. The reticle 70 is a bright line reticle backlighted with an incandescent lamp illuminator (not shown). The three element objective lens 74 projects the reticle image for the IR optical displays 102 and 134 and visible energy eyepieces eyepieces 100 and 128. As the projected reticle is a broad band or "white light" target, it is visible in all the optical displays simultaneously.

The range readout reticle 68 with a deposited light emitting diode (LED) pattern is combined with the boresight reticle image by means of the beamsplitter 72. As the LED pattern is red, it is only visible in display ports 102 and 134 displaying the IR scene. Range information for the visible telescope displays 100 and 128 is provided by LED arrays 136 and 138 located at the nominal infinity focus image plane of each of the 8× eyepiece assemblies 100 and 128. The utilization of a monocular eyepiece for viewing the daylight channel and a biocular eyepiece for viewing the thermal channel provides both channels simultaneously to both the gunner and commander and thus allows independent selection of the channel to be viewed at either station. It will be appreciated by one skilled in the art that inasmuch as the thermal channel includes a FLIR the electro-optical direct viewing with an image intensifier tube above described can be replaced with an analog electronic multiplexer for multiplexing the detector signals of the FLIR for display on a cathode ray tube (CRT) and viewed through monocular eyepieces.

To keep the diameter of the lenses at a reasonable size in the combined IR, reticle, and laser range display reticle optic path a focal plane is placed between the fold prisms 80 and 60. The scan position sensor 84 which may be, for example, a silicon detector assembly has its detector located at the focal plane. The scan position assembly will be described hereinafter in more detail. Between the focal plane and the gunner's visible light prism 60 is the relay lens 94. Relay lens assembly 94 is a double-gaussian type relay lens with a magnification of about 1.1×. It forms an image in the same position as, and is aberrationally compatible with the 8× telescope objective lens. The exit pupil position is also matched to the 8× objective lens 56. Passing through the 8× combining prism 60, the visible imaging from the 8× telescope is inserted into this optical path. The three element collimating lens group 112 provides a collimated output with common pupil position for both the 8× and IR imagery.

The muzzle reference sensor (MRS) lens 58 is to allow the 8× visible sight to focus on a muzzle reference target. The MRS lens 58 is manually switched into the optical path by the gunner to reduce the focal length of the 8× objective lens 56 by an amount necessary to focus on a muzzle reference target located on the gun barrel. The muzzle reference sensor is used in measuring gun tube bend, resulting from the heat generated by rapidly firing the gun, to provide a bias input to the gun-pointing proportional to the gun tube bend. When a MRS switch, which, for example, is mounted on the TILR housing 16 rear plate, is activated a signal is sent to a computer. The computer transmits an appropriate signal to the head mirror assembly 12 (via the line-of-sight electronics) to position the mirror 48 to the MRS position. The MRS position data are then fed the computer by the operator through the computer control panel.

LONG WAVELENGTH RANGEFINDER

The laser rangefinder (FIG. 4) utilizes a long wavelength (3 microns to 14 microns) laser. The longer wavelength (10.6 m) of a $CO_2$ laser provides higher atmospheric transmission to penetrate most battlefield smoke screens better than the shorter wavelength lasers.

A typical FLIR already includes in its design the types of components required by the laser receiver of the long-wavelength rangefinder. A FLIR, operating under the same environmental conditions of a rangefinder, uses a large aperture collecting lens system that focuses energy from the target onto a sensitive, cooled detector. This portion of the FLIR, therfore, duplicates the functions that must be performed by the laser rangefinder receiver. Thus, integration of these functions is a novel feature in the FLIR.

Figure 4:
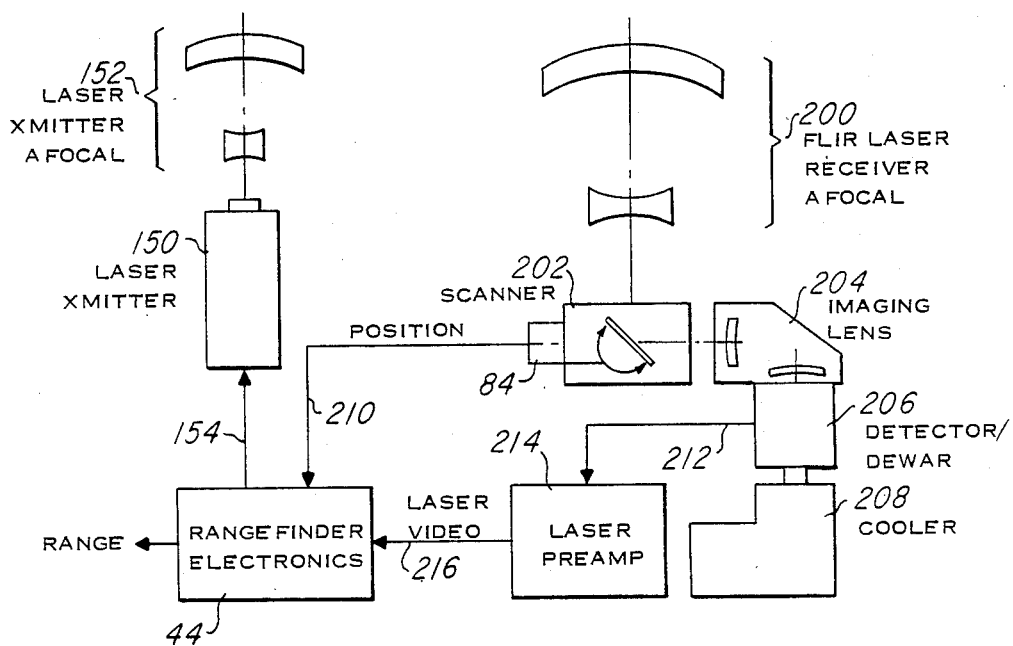
FIG. 4 is a view partly in schematic and block form of the second embodiment of the TILR invention.

Referring to FIG. 4, the long wavelength ($CO_2$) rangefinder includes a long wavelength laser transmitter 150 for transmitting a laser beam and a steering optics including a laser transmitter afocal lens 152. The laser transmitter 150 receives through lead 154 laser firing signals from rangefinder electronics 44. The long wavelength laser receiver has an IR optical path comprising a FLIR/laser afocal lens 200, scanner 202, imaging lens 204 and detector array 206. The detector array 206 is cooled to its operating temperature by a cryostat 208.

The scanner position sensor 84 is optically or electrically connected to the scanner. The sensor 84 produces a laser firing pulse which is connected by lead 210 to the rangefinder electronics 44.

Figure 3:
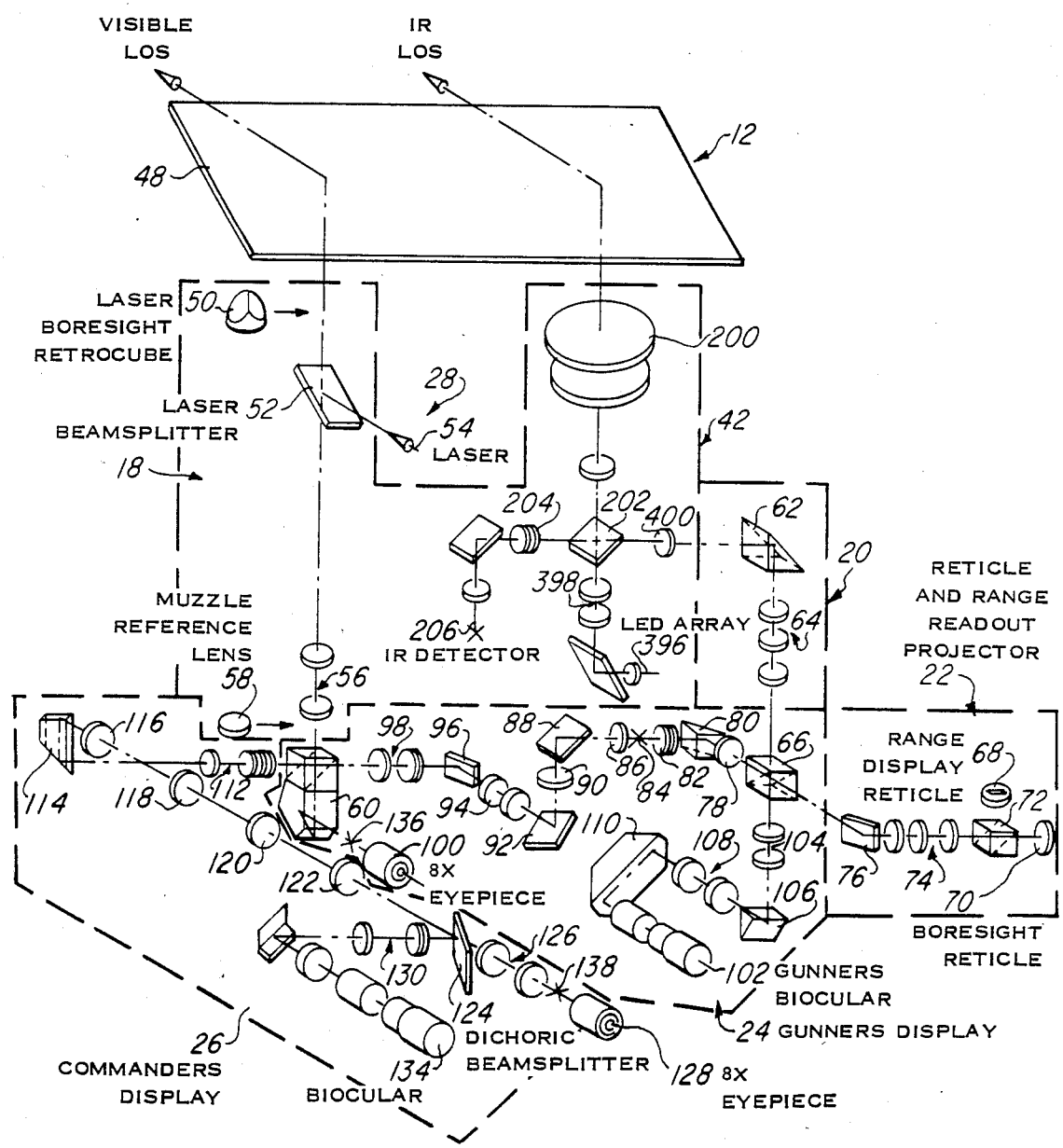
FIG. 3 is a schematic view of the optical system of the TILR invention.

For detecting a laser return, the detector array 206, in the preferred embodiment, has a preselected detector connected by lead 212 to a laser preamplifier 214. The preselected detector detects the laser return energy which is amplified to a working level by the preamplifier 214. Preamplifier 214 provides a laser energy return pulse signal through lead 216 to the rangefinder electronics 44. The rangefinder electronics computes the range for the range display reticle 68 (FIG. 3). For accurate ranging the firing of the laser and the position of the scanner must be synchronized.

Figure 13B:
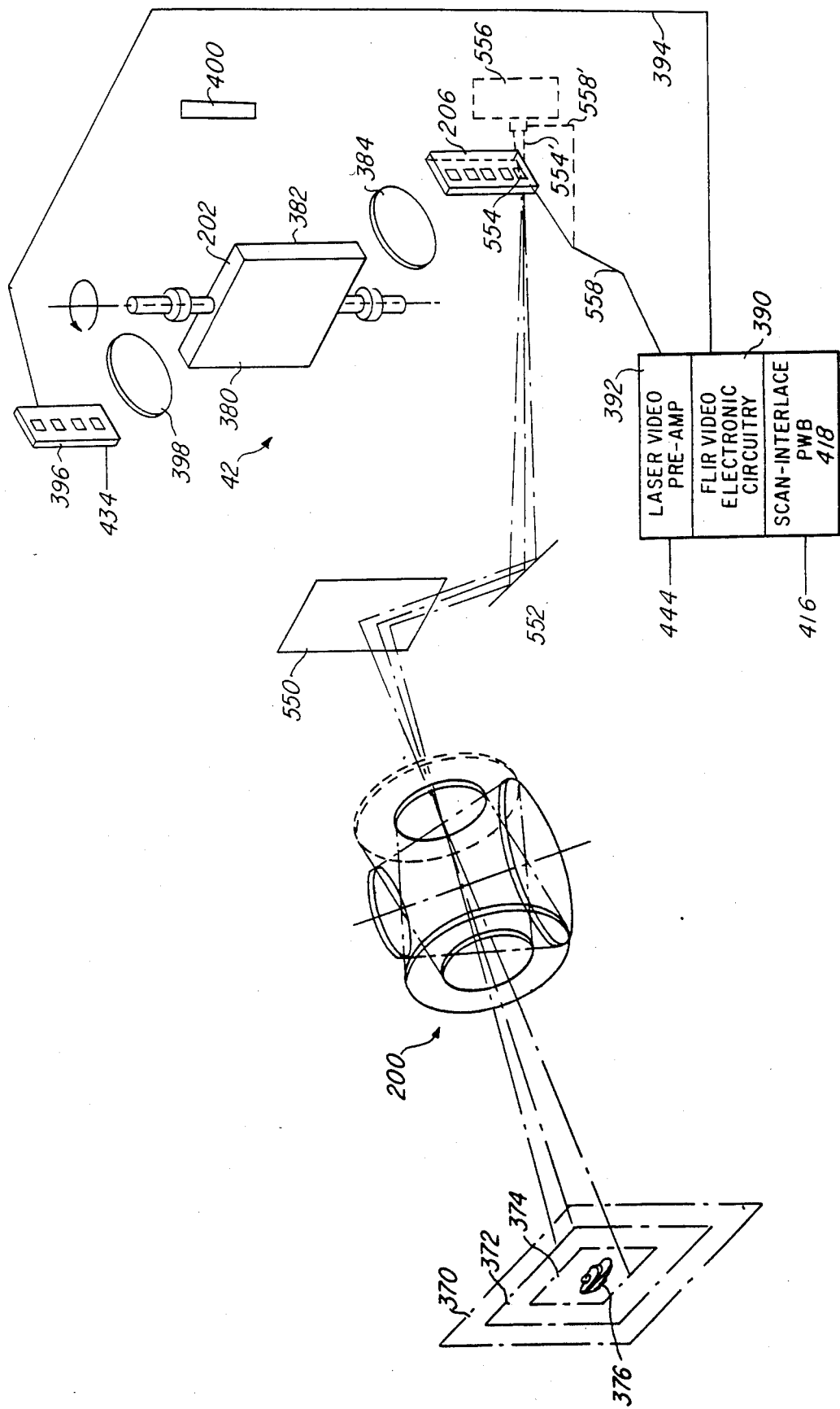

It is to be noted that use of the detector of detector array 206 for detecting a laser return does not interfere with the detector's function in the array when the laser detector amplifier and FLIR preamplifiers are connected in a parallel arrangement (FIG. 13a).

Figure 5:
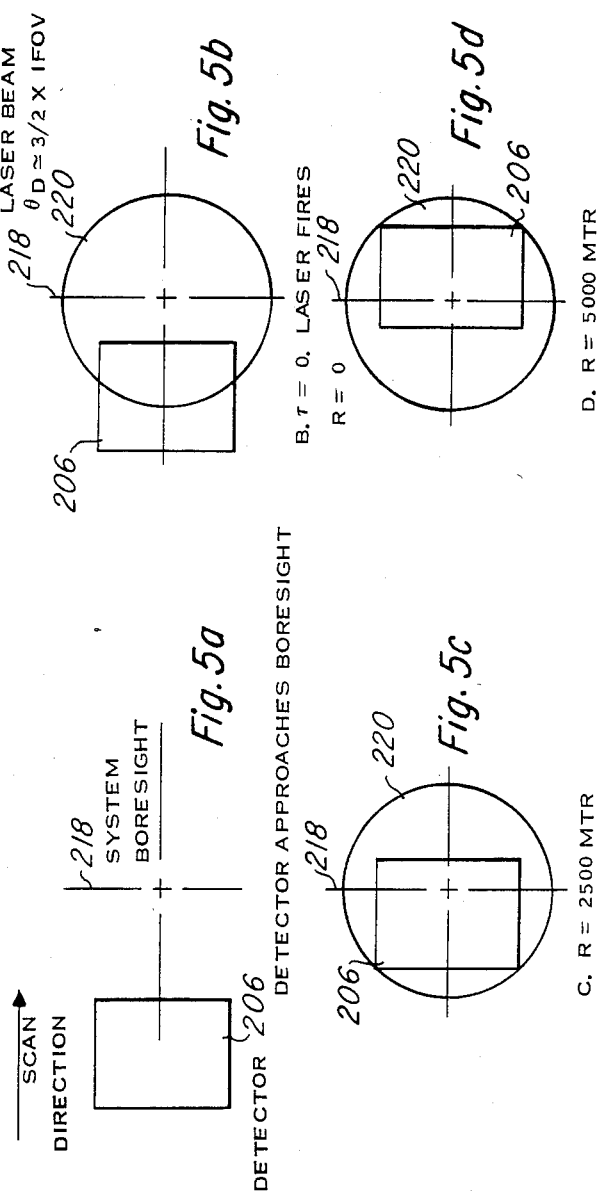
FIG. 5a–5d are views showing the time sequence of detector scanning the laser transmitter image.

The synchronization of the laser firing and the FLIR scanning motion is shown in FIGS. 5a-5d. FIG. 5a illustrates the apparent motion of the preselected detector 206, resulting from the left to right scanning direction of the scanner 202 (FIG. 4), with respect to the FLIR boresight 218 (FIG. 5a). The laser boresight is substantially coincident with the FLIR boresight. IF the FLIR is a typical image-plane one-dimensional scanner operating at standard (40 to 50 Hz) rates, the detector scan speed on the boresighted target is slow enough for the detector to receive workable portions of the laser return energy from targets whose range is unknown within about 5 Km.

As the detector 206 approaches the boresight location 218 (FIG. 5b), the laser is fired. The laser beam 220 travels to the target and returns (FIG. 5c) while the detector continues toward the boresight location. At some range (determined by the advanced firing time of the laser), the detector and return laser energy will be perfectly boresighted. (With parallax between the transmitter and receiver, two ranges can exist at which perfect boresight is achieved.) This boresight condition results in the maximum percentage of return energy impinging on the detector. At all other ranges (FIG. 5d) a smaller percentage of the return energy impinges on the detector.

The long wavelength ($CO_2$) transmitter (FIG. 6) comprises a power conditioner printed wiring board 224 connected by lead 226 to a power source (not shown). The power conditioner provides light emitting diode power through lead 228 to an optical bench 230 and regulated power through lead 232 to a power converter 234. The power converter 234 supplies a high (750 V) voltage dc power through lead 236 and a trigger pulse through lead 432 to a pulse forming network 238. The pulse forming network 238 supplies high voltage pulses through lead 240 to the laser cavity 242. The raw laser beam output of the laser cavity is in the optical path 244 to the optical bench 230.

Figure 7:
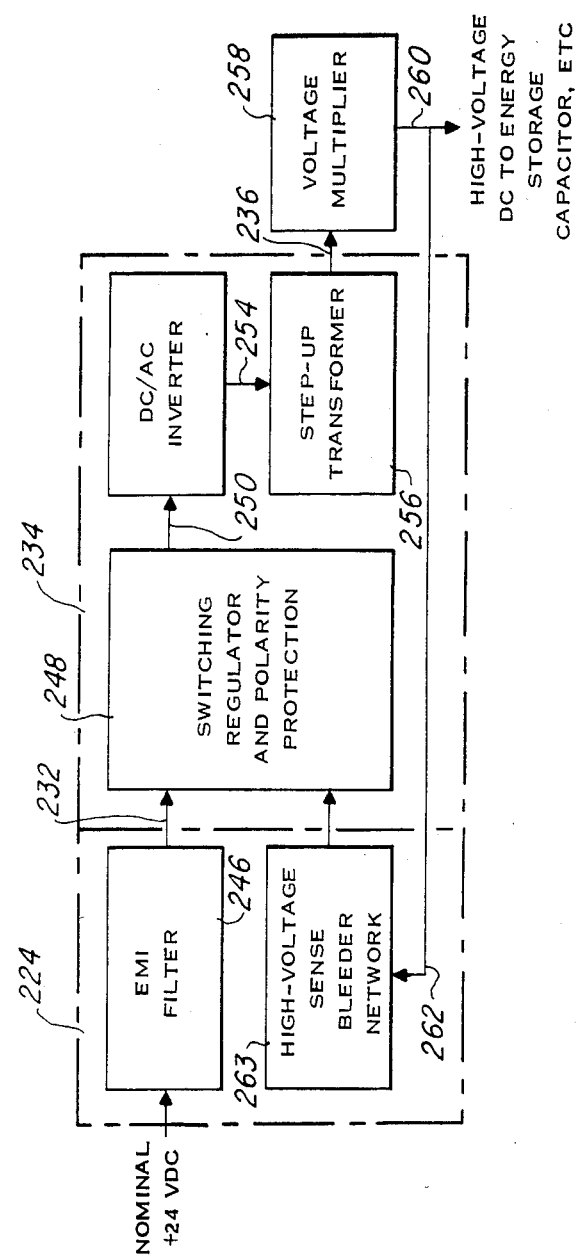
FIG. 7 is a functional block diagram of the power converter.
Figure 8:
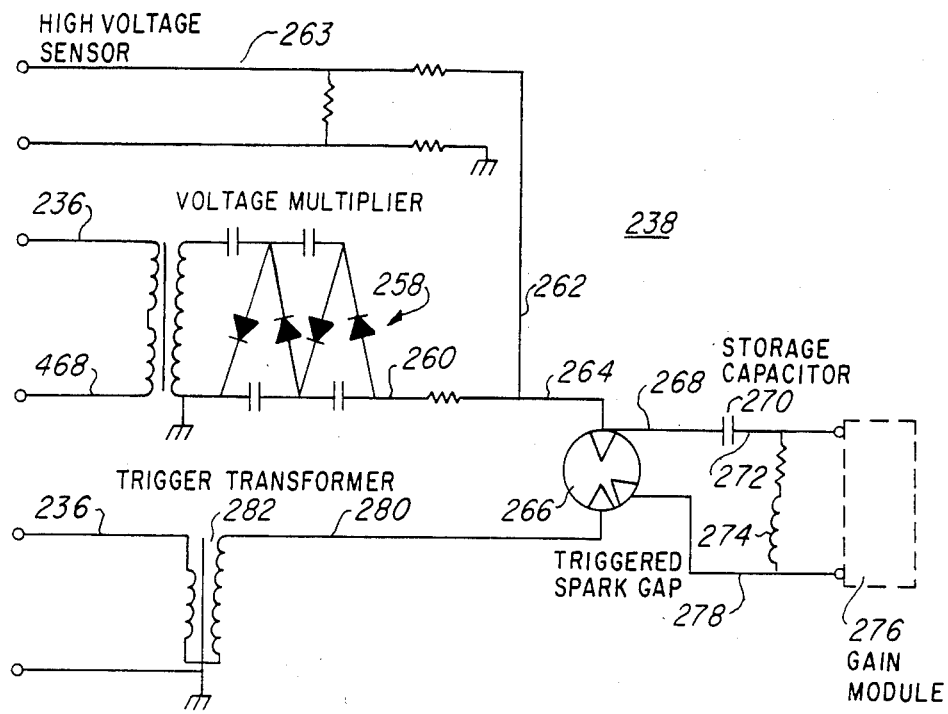
FIG. 8 is a schematic diagram of the pulse forming network (PFN)
Figure 9B:
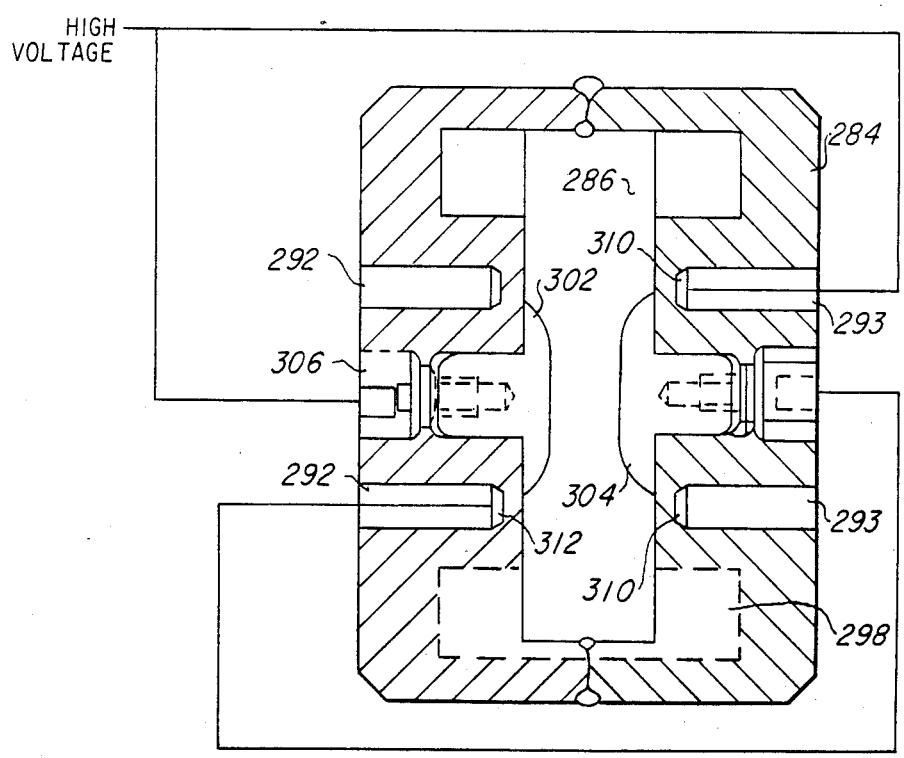
FIG. 9b is a cross-sectional view of the laser cavity taken along line B—B of FIG. 11.

The power conditioner 224 (FIG. 7) provides voltage preregulation of power (nominal +24 Vdc) from, for example, the TILR carrier and ground isolation for electromagnetic interference (EMI) suppression using an EMI filter 246 (FIG. 9). The EMI filter 246 which removes most of the high voltage spikes that appear on the dc power bus is connected by lead 232 to a switching regulator and polarity protection circuit 248 of the power converter 234 (FIG. 7). The switching regulator 248 which provides a dc voltage at high efficiency is connected by lead 250 to a dc/ac inverter 252. The dc/ac inverter 252 is connected by lead 254 to a step-up transformer 256 which outputs a high-voltage ac power through lead 236 to a high voltage multiplier network 258 (FIGS. 7 & 8) of the pulse forming network 238.

Figure 6:
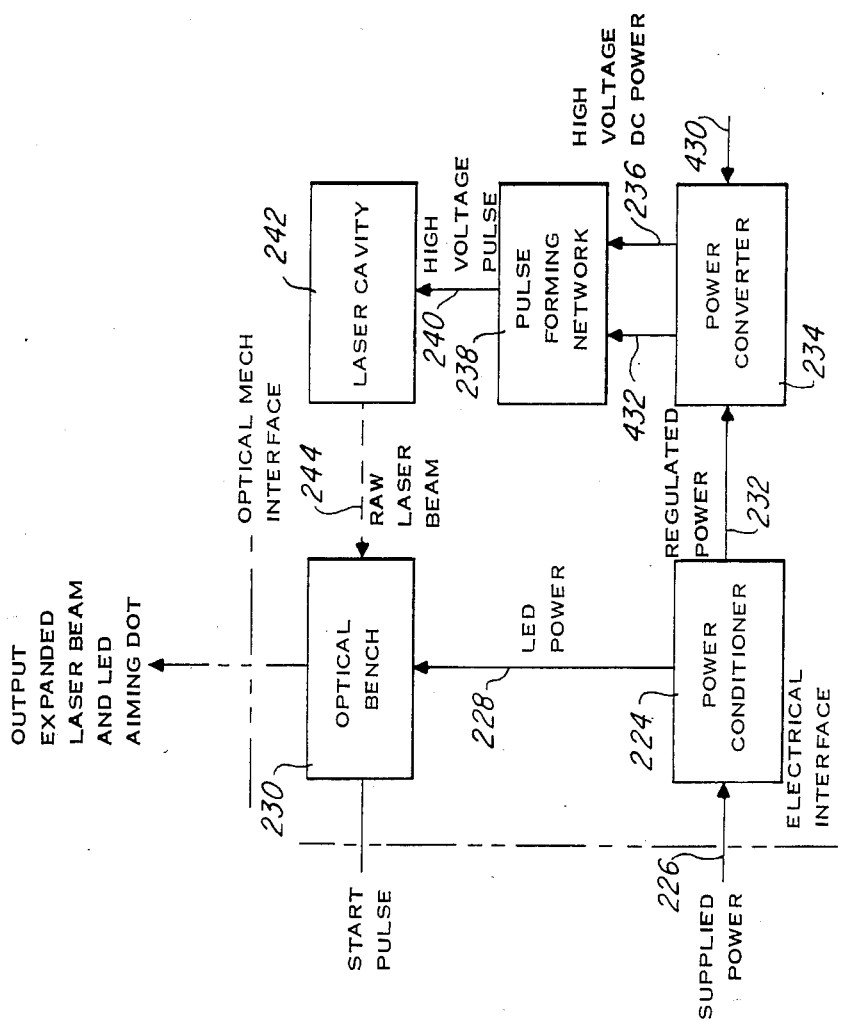
FIG. 6 is a functional block diagram of the laser rangefinder transmitter of the second embodiment of the TILR invention.

The pulse forming network (FIG. 8) is charged by the power converter 234 (FIG. 7). The voltage multiplier and surge protection network 258 which receives a chopped dc from the step up transformer 256 (FIG. 7) is connected by lead 260 (FIG. 8) to the junction of leads 262 and 264. Lead 262 is connected to a high voltage sensor/bleeder network 263 which provides a high dc sense voltage for setting the dc regulator voltage. Lead 264 is connected to a first terminal of a spark generator 266. The first terminal of the spark generator is also connected by lead 268 to a first plate of a high voltage energy storage capacitor 270 having reliable operation at one pps continuous and five pps burst modes. The second plate of capacity 270 is connected by lead 272 to the junction of a shunt charging impedance network 274 and a gain module 276 of the laser cavity 242 (FIG. 6). A second terminal of the spark generator 266 is connected by lead 278 to the junction of a second end of the shunt charging impedance 274 and second terminal of the gain module 276. A third terminal of the spark generator 266 is connected by lead 280 to a high voltage trigger transformer 282.

Figure 9A:
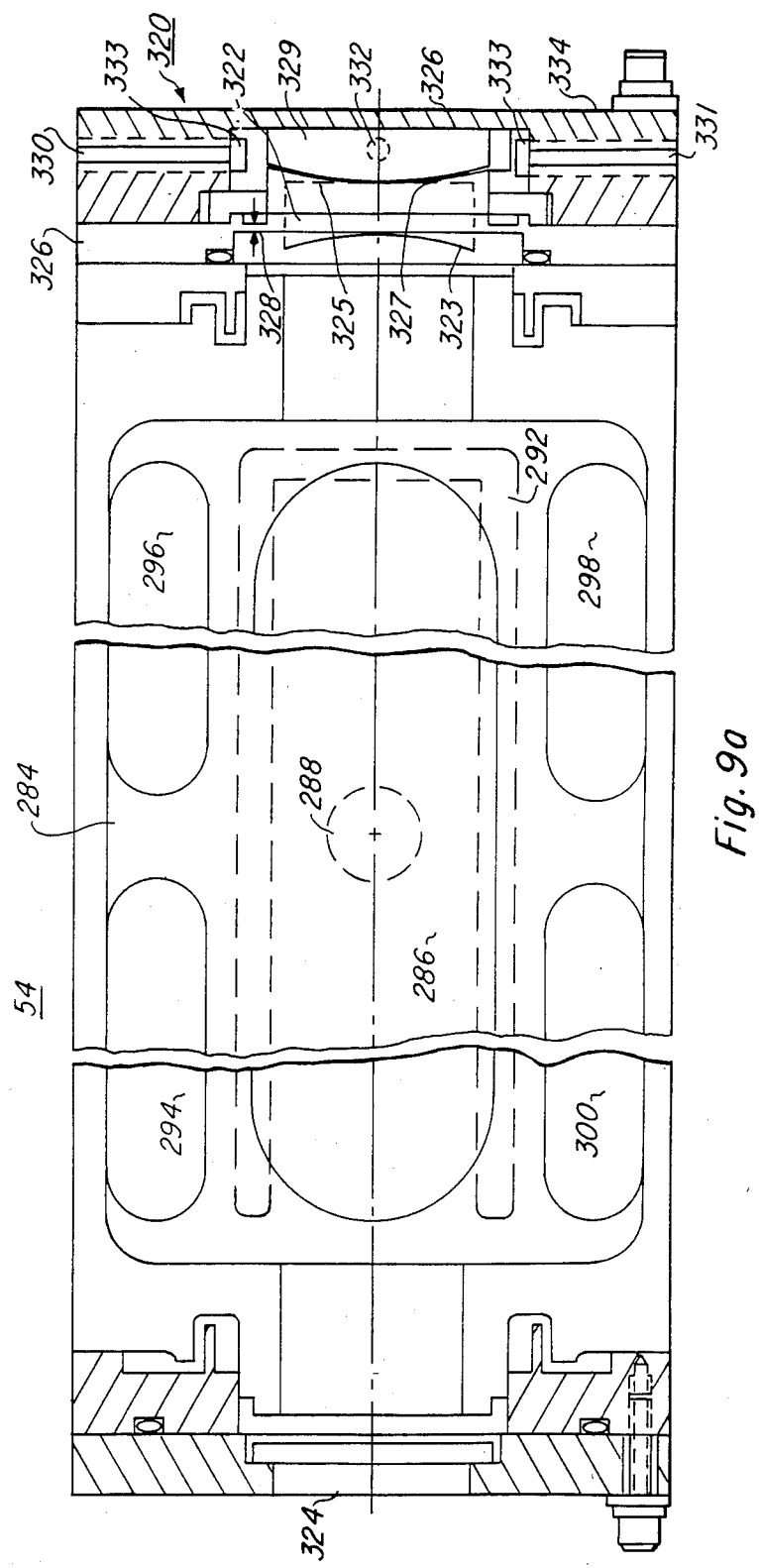
FIG. 9a is a fragmented cross-sectional view of the laser cavity taken along line A—A of FIG. 11.

The laser 54 (FIG. 9) comprises a housing 284. The housing 284 is preferably formed of a ceramic manufactured by Corning Glass Manufacturer under the trademark MACOR. The housing forms an elongated cavity 286, a pair of electrical channels 288 and 290 for electrode power coupling, a pair of U-shaped preionizer slots 292 and 293 (FIG. 9b) and gas ballast cups 294, 296, 298, 300 (FIG. 9a). A pair of electrodes 302 and 304 (FIG. 9b) are mounted in the laser cavity 286. The electrode 304 is connected to ground and the electrode 302 to the high dc voltage. A pair of U-shaped preionizers 310 and 312 are mounted respectively, in preionizer slots 292 and 293. Preionized 293 is connected to the high voltage source, preionizer 292 is connected to ground. The cavity 286 and gas ballast cups 294, 296, 298 and 300 are in communication and filled with a gas mixture comprising, for example, carbon dioxide, nitrogen, and helium.

The U-shaped preionizers produce a corona discharge which produces UV radiation. The UV radiation photoionizes the gas in the main discharge region between the electrodes. This preionization of the main discharge region, when sufficient electron density is reached, reduces its impedance below that of the corona discharge and causes the remainder of the energy stored in capacitor 270 to be dumped into the main discharge region.

At a first end of cavity 286 (FIG. 9a) there is a total reflector assembly 320. The reflector assembly 320 comprises a mirror 322 having an inwardly deposed spherical surface 323 for reflecting the laser light through the cavity to an output coupling mirror 324. Mirror 322 has an outwardly deposed flat surface 325 which is fitted to a plate 326 which is preferably of brass. Brass plate 326 has a concave exterior surface 327 having a large (8") radius of curvature and a small (about 0.5") diameter, and a thin annular shaped membrane 328 integral with the part forming the concave exterior surface. An alignment block 329 has a convex surface corresponding to the concave surface 327 of the plate 326. The alignment block 329 has four equally spaced (90°) adjustment screws 330, 331, and 332 (the fourth is not shown) and bearing shims 333 for orthogonal movement of the convex surface. The alignment block 329 is held against the brass plate 326 by a retaining plate 334. In operation the four adjustment screws are selectively adjusted to move the alignment block 329 which forces the brass plate 326 to bend at the machined membrane 328 to tilt the reflecting mirror 322.

Figure 10:
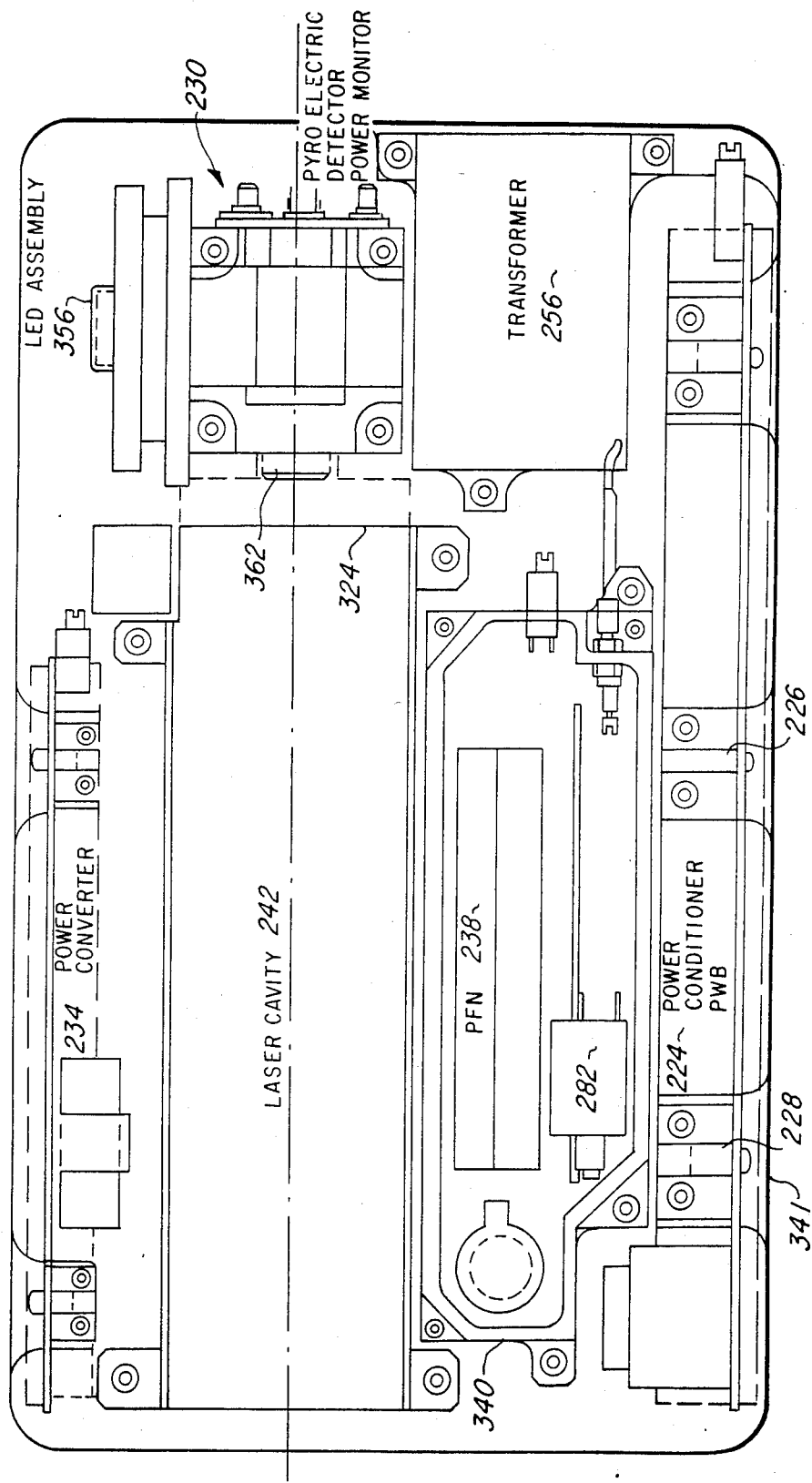
FIG. 10 is a plan view of the laser transmitter.

The laser transmitter system 40, as shown in FIG. 10, is arranged as follows. The power conditioner 224 is secured adjacent to a first side of a main housing 341. The step-up transformer 256 is attached to the main housing 341 adjacent to a first end of the pulse forming network (PFN) 238. The pulse forming network 238 is secured to a base plate 340 adjacent to the laser cavity 242. The base plate 340 is attached to the main housing 341. The laser cavity 242 is secured to the base plate 340 between the pulse forming network and power converter printed wiring board 234. The power converter board 234 is attached to the main housing 341 adjacent an edge opposed to the power conditioner printed wiring board 224. The laser optical bench assembly 230 is connected to the main housing 341 in optical alignment with output coupling mirror 324.

Figure 11:
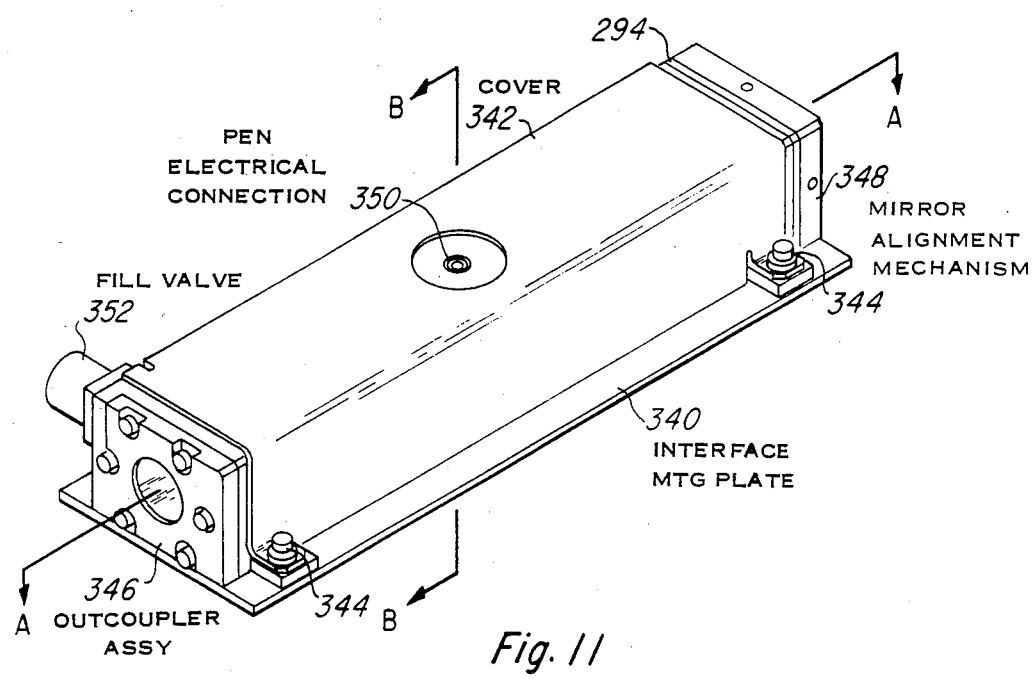
FIG. 11 is an isometric view of the laser transmitter.

A cover 342 (FIG. 11) is attached to base plate 340 by bolts 344 between the outcoupler assembly 346 and mirror alignment mechanism 348. The cover 32 includes an electrical connection 350 for the pulse forming network and a gas fill valve 352 for the laser cavity.

The optical bench 230 (FIGS. 6 & 10) is for reducing the laser beam divergence to two milliradians, monitoring the laser power output for the range counter start pulse and malfunction condition and producing a visible (red) reticle that is aligned with the laser to be injected into the visible optics of the gunners primary sight. This reticle will provide an indication of the direction the laser beam is aimed for boresighting purposes.

Figure 12:
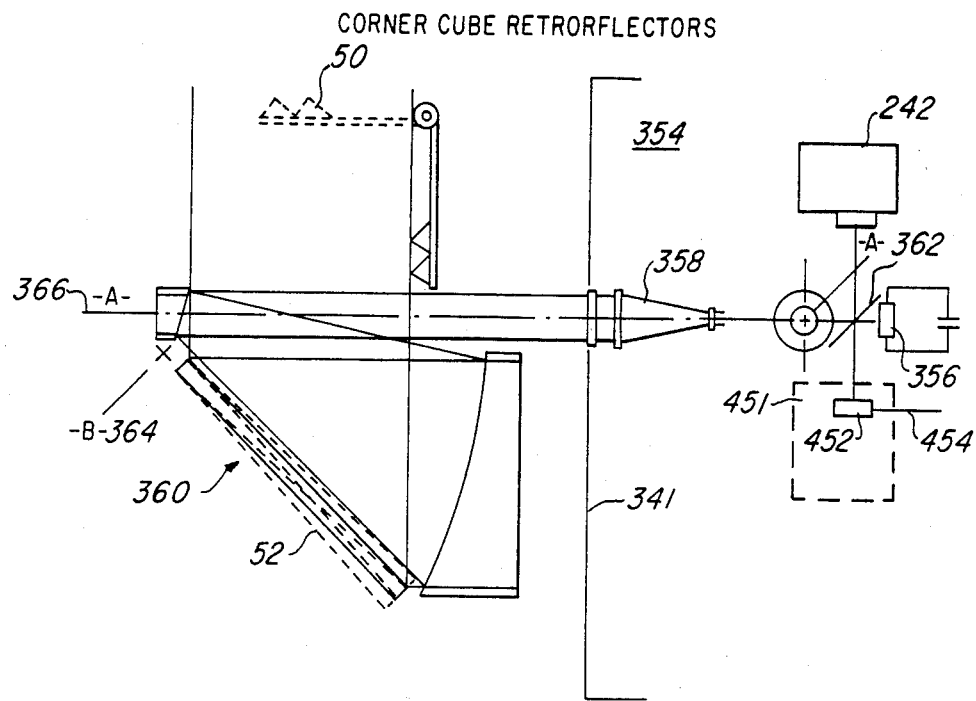
FIG. 12 is a front view of the laser boresight mechanism.

The optical bench 230 (FIG. 10) comprises a laser beam sterring axis 354 (FIG. 12) including within the laser main housing 341, a pyroelectric detector 452 for detecting laser firings, a light emitting diode 356 for producing a signal (red dot) aligned permanently with the laser beam and a laser beam expander optics having an afocal lens 358, and within the visible light optic channel 18 a laser beam steering mechanism 360 and the corner cube retroreflector 50.

The LED 356 is permanently aligned with the laser beam through a beamsplitter 362, afocal lens 358 and the beam steering mechanism 360. The laser cavity 242 output is to the beamsplitter 362 which passes first preselected portions of the laser beam to a pyroelectric detector 452 and reflects a second preselected portion through afocal lens 358 and beam steering mechanism 360. The beam steering mechanism 360 includes the dichroic beam splitter 52 which is tiltable through manual manipulation of a mechanical linkage. The dichroic beamsplitter is mounted in the visible optic path for rotation about axis 364 for adjustment in elevation and the afocal assembly 358 is mounted for rotation around the laser input axis 366 for adjustment in azimuth. The adjustments are made by the operator manipulating mechanical linkages.

For boresighting the laser, the array of corner cube reflectors 50 is switched into the visible sight optical path to reflect the red dot emitted by the LED 356 into the optical eyepiece. Boresighting is accomplished by the operator manipulating the vertical and azimuth mechanical linkages until the red dot rests in a preselected position with respect to the reticle.

FORWARD LOOKING INFRARED (FLIR) SYSTEM

The forward looking infrared (FLIR) system 30 (FIGS. 3 & 13a) in a first embodiment comprises an afocal lens 200 which is rotatable to selectively receive energy from a wide field of view (FOV) 370, intermediate FOV 372 and narrow FOV 374 containing a target 376 for a scanner 202. Scanner 202 has front and back mirrored surfaces 380 and 382. The scanner's front surface 380 reflects the IR energy emanating from the scene and the laser energy scattered by the target through a coverging lens 384 onto an array of infrared detectors 206. The array of detectors 206 has, for example, a total of one hundred eighty detectors of which only one hundred twenty are activated to detect the scene. Thus, either one of the 120 active detectors preferable a center one or as in a second embodiment (FIG. 13b), one of the remaining sixty detectors is used for detection of the scattered laser energy. The array of detectors 206 is connected by bus 388 to a FLIR video preamplifier 390 and the detector selected for laser detection is also connected by lead 391 to a laser video preamplifier 392. This connection of one detector of the array for laser detection has no adverse effect on the image produced by the array of detectors. The FLIR preamplifier 390 is connected by bus 394 to a corresponding array of light emitting diodes 396.

The image producing array of LEDs 396 includes an additional preselected number, for example, one or three LEDs which are activated to provide a scan position sensor signal or signals for firing the laser. Thus, the array of LEDs provide the visible image of the scanned scene and the scan position sensor signal through an optical path including lens 398 a collimating lens 400 (FIG. 13) to beamsplitter 62 (FIG. 3) of the IR optical channel 20 and relay optics where the scan position sensor signal impinges on the sensor 84.

A second embodiment of the FLIR system 30 (FIG. 13b) utilizes dead time of the scanner electronics as follows. During the FLIR dead time, the laser 40 is fired and a reflecting chopper 550 is switched into the FLIR's optical path between the afocal lens 200 and scanner 202. The reflecting chopper 550 reflects the laser return signals to a reflector mirror 552 which reflects the laser return to a detector 554. In the case where the array of detectors 206 does not utilize all the available detectors an additional detector of the array of detectors is used. At the present time FLIR detector arrays comprise only 120 detectors of 180 detectors. Thus, one of the additional 60 can be used. However, in what is considered a third embodiment a separate detector 554' is used. Although the use of a separate detector 554 permits detector position selection it requires the use of another cooler 556 to cool it to its operating temperature. The output of the detector 554 is connected by lead 558 to the laser video amplifier 392.

Using one of the FLIR's thermal detectors as a laser rangefinder receiver detector requires synchronization of the laser fire signal and the scan position sensor signal. The scan position sensor 402 (FIG. 14) comprises a light transducer which is, for example, the silicon detector 84 (FIGS. 3 & 14) and a reticle grating 404 positioned in the IR channel optical path to receive light from the scan position sensor signal LEDs and generate a preselected number (7) of electrical scan positon sensor signals when the scanned light is in line with the reticle grating 404. The scan position sensor signals are connected by lead 406 to the laser rangefinder electronics 408. The reticle grating 404 can also be an opaque body with a plurality of slots.

In a final embodiment the FLIR is adapted to transmit the laser beam through its IR optics. This is accomplished during interlace deadtime of the FLIR using a movable mirror reflector for selective insertion into the IR optics.

RANGEFINDER ELECTRONICS

Figure 14:
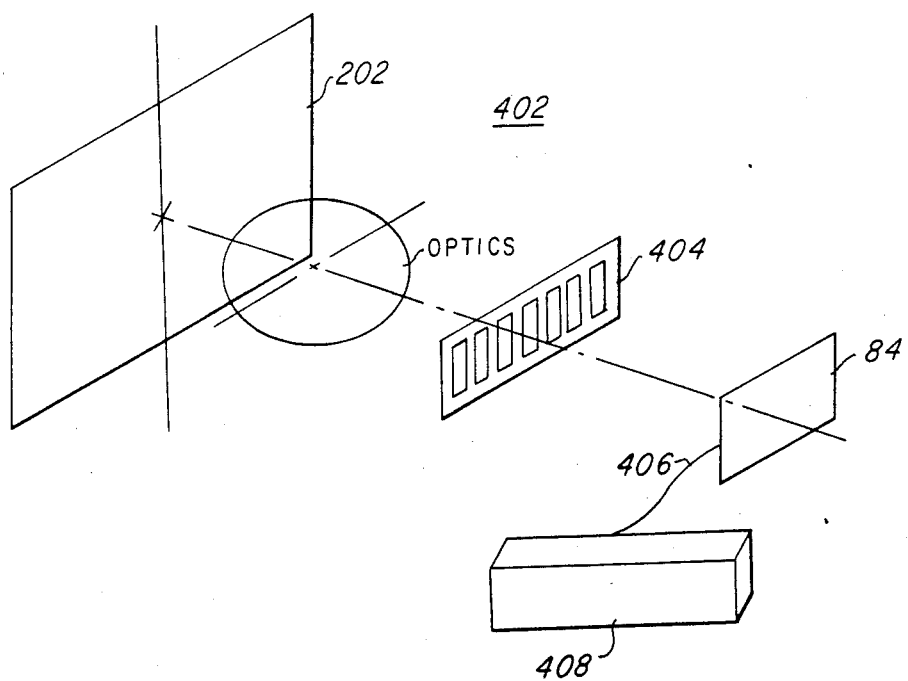
FIG. 14 is a functional diagram of the laser trigger signal generating mechanism.
Figure 15:
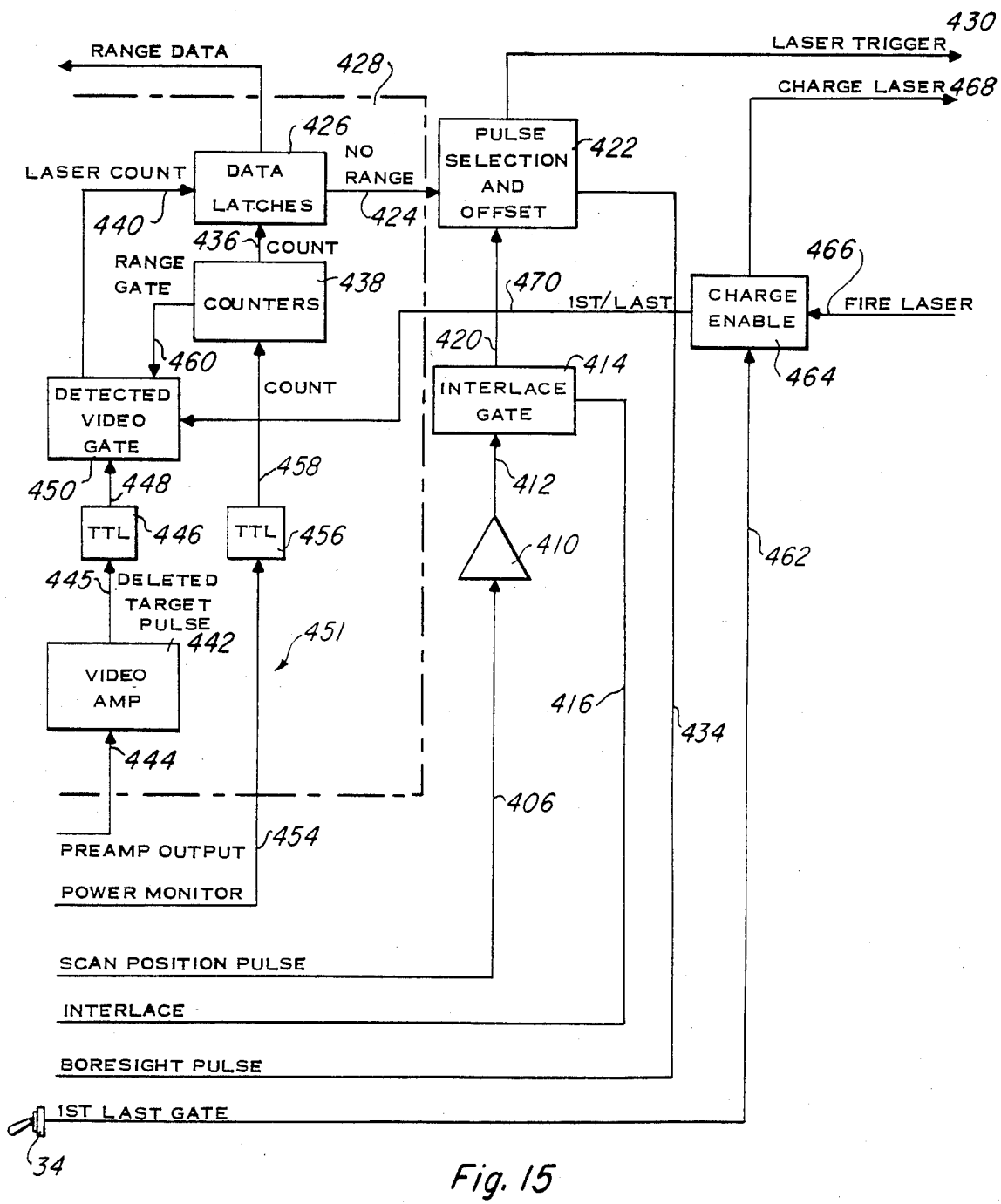
FIG. 15 is a schematic diagram of the laser rangefinder control electronics.

The range electronics 408 (FIGS. 14 & 15) receives the scan position pulses through lead 406 and amplifies them in amplifier 410 (FIG. 15). The amplified output is connected by lead 412 to an interlace gate 414. The interlace gate is connected by lead 416 to the FLIR scan interlace printed wiring board 418 of the FLIR video electronics 390 (FIG. 13). The interlace gate goes OFF when the scanner is past the detector for interlace movement and, for example, during scanning from right to left and goes ON when the scan is from left to right.

The interlace gate is connected by lead 420 (FIG. 15) to a pulse selection and offset circuit 422. The pulse selection and offset circuit 422 is connected by lead 424 to data latches 426 of a range data circuit 428. The pulse selection and offset circuit is set to receive a preselected pulse from the number of light pulses detected by the light detector 84 (FIGS. 3 & 14). If a "no range" signal is received from the data latches 426 of the range data circuit, a second pulse is selected and so on until range information is received. In addition, any time offset determined by the system or operator is entered. A laser trigger pulse is generated by the pulse selection and offset circuit 422 on lead 430 for the power converter 234 (FIG. 6) and applied through lead 432 to the PFN 238 and the laser cavity 242 fired. The pulse selection and offset circuit 422 (FIG. 15) is also connected by lead 434 to the center emitter of the LED array 396 (FIG. 13) of FLIR 30 to create a reference spot for boresight purposes.

The range data electronics (FIG. 15) is comprised of the data latches 426 connected by lead 436 to the range counters 438 and by lead 440 to the detected video gate 450. The range counters 438 are connected by lead 460 to the detected video gate 450 and by lead 458 to a comparator 456 which converts signals received through lead 454 from the power monitor 451 (FIG. 12) to TTL compatible levels. The range data electronics also includes a video amp 442 (FIG. 15) which is connected to the laser preamp 392 (FIG. 13a) by lead 444 and to a comparator 446, which converts signals received to TTL compatible levels, through lead 445.

The power monitor 451 (FIG. 12) produces a signal generated by the pyroelectric detector 452 which is proportional to the laser's output energy. This signal is passed through comparator 456 to the range counters 438 where it starts the counters. The laser preamp 392 (FIG. 13a) amplifies the detected target returns and sends them on to the video amp 442 where they are amplified to levels suitable for detection. The target returns are then detected by the comparator 446 and sent to the detected video gate 450 where they are selectively gated based upon target range and first/last logic mode. The gated pulses enable the data latches 426 for storing the value of the range counters 438. The data latches 426 are connected to the fire control computer which converts their count information to range.

The charge enable circuit 464 is connected by lead 466 to the fire laser switch (not shown), by lead 468 to the power converter 234 (FIG. 6), by lead 462 to the first/last/safe switch 34, and by lead 470 to the detected video gate 450. The charge enable circuit receives a signal from the first/last/safe switch which it decodes to be either First, Last or Safe. It then sends the appropriate first or last signal to the detected video gate 450. If the fire laser 466 is sent to the charge enable circuit 464 and a safe condition doesn't exist, then a signal is sent to the power converter 234 (FIG. 6) to charge the laser PFN.

LASER PREAMPLIFIER

Figure 16:
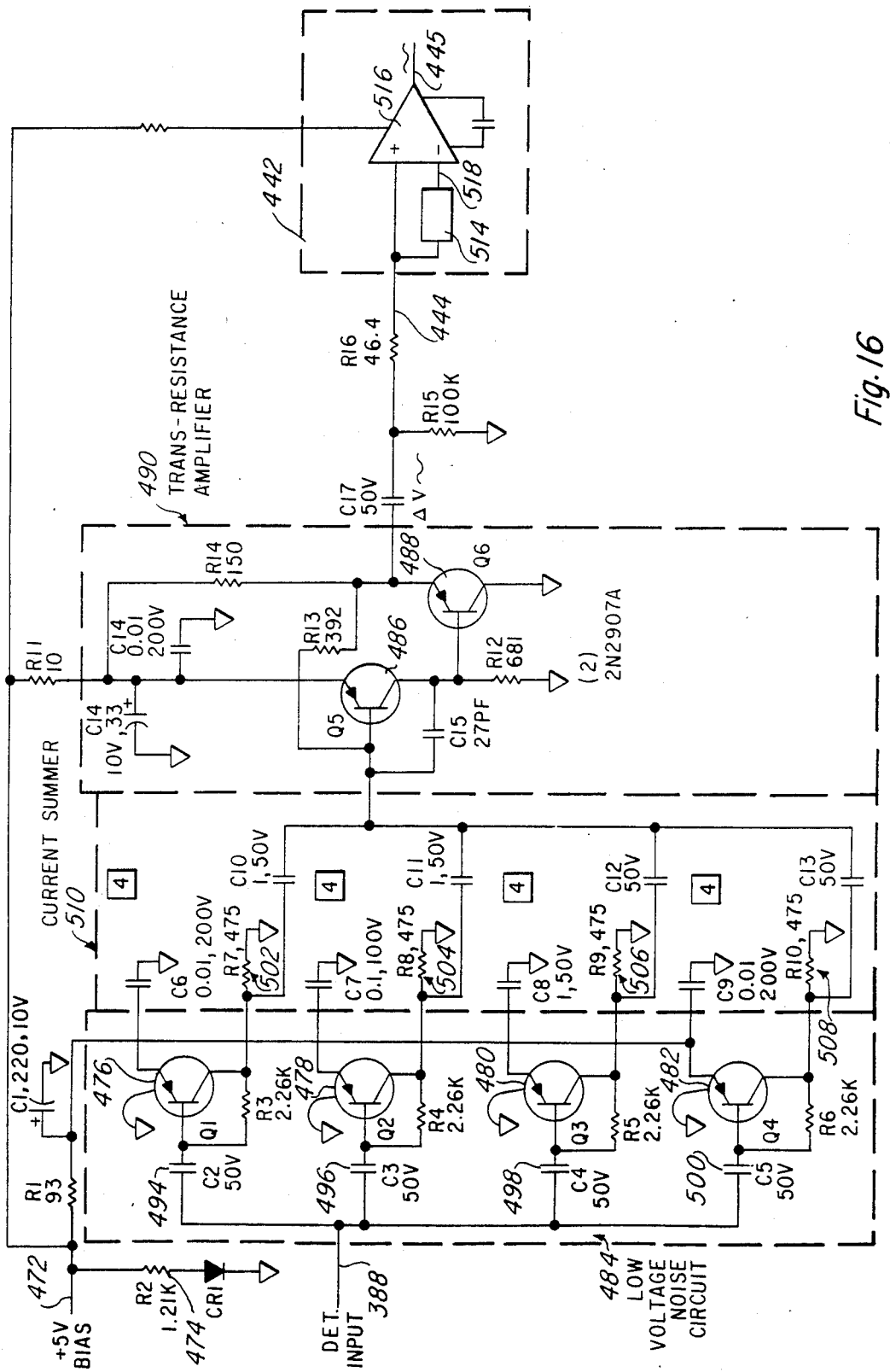
FIG. 16 is a schematic diagram of the laser return signal amplifier.

The laser preamplifier 392 (FIGS. 13a and 16) includes a 5 V detector bias voltage (FIG. 16) connected by lead 472 to the junction of a first end of a resistor 474 and to the junctions of emitters of a plurality of transistors 476, 478, 480 and 482 and grounding capacitors of a low voltage noise circuit 484 and a plurality of transistors 486 and 488 of a trans-resistance amplifier 490.

The second end of resistor 474 is connected to the junction of the laser detector output lead 388 (FIGS. 13a and 16) and to a plurality of filter capacitors 494, 496, 498 and 500 (FIG. 18) of the low voltage noise circuit 484. The filter capacitors are connected to the bases of the transistors 476, 478, 480 and 482. The resistors shown are to depict the internal resistance of the transistors and are biasing resistors. The collectors of transistors 476, 478, 480 and 482 are connected, respectively, to elements 502, 504, 506 and 508 of a current summer 510. The output of the current summer 510 is connected to the junction of the base of transistor 486 and feedback circuit from the emitter of transistor 488 of the trans-resistance amplifier 490. The collector of transistor 486 is connected to the base of transistor 488 and the collector is grounded to provide an emitter follower.

Thus, the voltage of the laser return detector is noise filtered and amplified in the low voltage noise circuit 484 by the plurality of parallel connected transistors, summed in a corresponding plurality of summers in the current summer 510 and a difference voltage produced by the trans-resistance amplifier 490.

The difference voltage output of the trans-resistance amplifier 490 is connected by lead 444 to the junction of a delay line 514 and positive terminal of an operational amplifier 516 of the video amplifier 442. The delay line 514 is connected by lead 518 to the negative termnal of the operational amplifier. The operational amplifier combines the non-delayed output of the trans-resistance amplifier with the delayed output of the delay line to produce on lead 445 (FIGS. 15 & 16) a plurality of sharp or spike like pulses representative of the laser returns.

OPERATION

In operation the integrated laser/FLIR rangefinder is turned ON. At start up the laser boresight LED 356 (FIG. 12), the bright light reticle 70 (FIG. 3) and the FLIR LEDs 396 (FIG. 13a) are ON. First the operator aligns the boresight spot generated in the FLIR to the visible recticle of eyepieces 100 & 128 (FIG. 3). The operator then boresights the visible light energy optic path to the laser by switching in the corner cube retroreflectors 50 (FIGS. 3 & 12) to reflect the laser orienting light dot onto the recticle of the eyepieces 100 and 128 (FIG. 3). After any corrections are made the corner cube retroreflector 50 is switched out of the optic path. The switching of the corner cube reflector can control the ON/OFF position of the laser boresight LED 356.

Next, the operator adjusts the head mirror assembly 12 (FIGS. 1 and 3) in azimuth and elevation for viewing a desired target area. If the target area is such as to produce substantial clutter, the operator selects the last pulse of the first/last switch 34 (FIG. 1) to use the last pulse of the laser burst for rangefinding. With the selection of the first or last pulse the laser is ready for firing.

The FLIR 42 (FIG. 3) of the IR energy optical system produces a visible representation of the IR energy emanating from a scene for use during fog, smoke, or nighttime conditions. The visible light energy optical channel is also available for use during normal conditions. The operator views the scene for a target, boresights the target and pushes the laser fire button. To the operator the laser appears to fire simultaneously with the pushing of the button, actually though the FLIR scanner (FIGS. 3 and 13a) is scanning the scene and the light from the FLIR LEDs 396, which is reflected by the backside of the scanner, is following the scanners movement. When the scanner 202 approaches boresight, light from the selected LEDs become sequentially aligned with the slots or gratings of the grid 404 (FIG. 14) and passes in turn through the slots onto the silicon transducer 84. The transducer 84 produces a series of time spaced signals. One of the time spaced signals is selected for generating a trigger pulse on lead 430 (FIG. 17) for firing the laser. A monitor 452 (FIG. 12) determines whether the laser power is acceptable for ranging and if so starts the counter 438 (FIG. 15).

When the laser beam strikes the target the beam is scattered. The scattered laser beam (return beam) is detected by the preselected detector of the array detectors 206 (FIG. 13a) of the FLIR and generates a detection signal for a latch 426 (FIG. 17). The latch 426 latches the count of the counter. From this count the gunner can obtain range information from a table, or the main computer computes the range for display.

If no range information is received the target might have been either too close or too far away and outside the detection time of the selected laser triggering pulse. The timing is changed in the pulse selection and offset circuit 420 and the laser is automatically fired again. The laser is only allowed to be fired a maximum of four times.

Although preferred embodiments of the present invention have been described in detail, it is understood that various changes, substitutions and alterations can be made therein without departing from the scope of the invention as defined by the appended claims.

What is claimed is:

1. In an integrated laser/forward looking infrared (FLIR) rangefinder wherein the laser beam is injected into the visible light optical path of the sight for transmission, a laser boresight mechanism comprising:
   (a) a light source for producing a light target coaxial and parallel to the laser beam;
   (b) a laser beam expander optics for expanding the laser beam and light target and for projecting the light target and laser beam along a common path;

(c) a beam steering mechanism for steering the laser beam and light target along the common path;

(d) a laser boresight reflector means switchably mounted adjacent to the visible light optics path outlet for selectively switching the laser boresight reflector means in and out of the optical path for reflecting the light target back through the beam steering means and visible light optical path to a telescope for boresighting;

(e) a telescope having a visible reticle for receiving the light target reflected by the laser boresight reflector means; and (f) a line of sight adjustment means for selectively adjusting the laser beam expander optics and beam steering mechanism for aligning the light target to the telescope reticle without the introduction of off-axis aberrations for maintaining optical performance.

2. In an integrated laser/forward looking infrared (FLIR) rangefinder according to claim 1 wherein the light source is a light emitting diode for projecting a light target of a preselected configuration.

3. In an integrated laser/forward looking infrared (FLIR) rangefinder according to claim 1 wherein the laser beam expander optics for expanding the light target includes a rotatable afocal assembly mounted for rotation around the laser input axis for adjustment of the light target in a first direction, and the beam steering optical mechanism includes a tiltable beamsplitter for adjustment of the light target in a second direction whereby optical performance of the laser beam expander optical path is maintained after adjusting the light target in the first and second directions and the laser beam expander optics and beam steering optical mechanism are combined for compactness.

4. In an integrated laser/forward looking infrared (FLIR) rangefinder according to claim 3 wherein the line-of-sight adjustment means comprises a first control means including a mechanical linkage connected to the laser beam expander optics, a gear means connected to the mechanical linkage and a control knob connected to the gear means for rotating the beam expander about the input laser axis for the first direction alignment, and a second control means including a mechanical linkage connected to the beam steering mechanism and a control knob connected to the mechanical linkage for tilting the beam steering mechanism about an axis adjacent the beam steering mechanism for the second direction alignment.

* * * * *